United States Patent [19]

Kang

[11] 4,098,991

[45] Jul. 4, 1978

[54] REMOVAL OF CATALYTIC RESIDUES FROM HYDROGENATED THERMOPLASTIC OR ELASTOMERIC POLYMERS

[75] Inventor: Jung Wong Kang, Clinton, Ohio

[73] Assignee: The Firestone Tire & Rubber Company, Akron, Ohio

[21] Appl. No.: 772,374

[22] Filed: Feb. 25, 1977

Related U.S. Application Data

[63] Continuation-in-part of Ser. No. 612,620, Sep. 12, 1975, abandoned.

[51] Int. Cl.$^2$ ............................ C08F 6/08; C08C 2/04
[52] U.S. Cl. ................................ 528/492; 260/816 R; 526/25; 526/26; 526/340
[58] Field of Search ............. 260/816 R, 816; 526/25, 526/26; 528/492

[56] References Cited

U.S. PATENT DOCUMENTS

| | | | |
|---|---|---|---|
| 3,037,011 | 5/1962 | Leibson et al. | 260/93.7 |
| 3,071,566 | 1/1963 | Cassar et al. | 260/88.2 |
| 3,258,456 | 6/1966 | Nelson | 260/93.7 |
| 3,780,138 | 12/1973 | Hassell et al. | 260/880 B |

*Primary Examiner*—Stanford M. Levin

[57] ABSTRACT

A process for the removal of catalytic residues from hydrogenated thermoplastic or elastomeric polymers is achieved by treating the residue with an amine compound. The amine compound is selected from the class consisting of an HCl salt of an amine or a diamine having an alkyl group containing from 1 to 12 carbon atoms, a cycloalkyl group containing from 4 to 12 carbon atoms, an aryl group containing from 6 to 12 carbon atoms, and combinations thereof; a substituted glyoxime wherein the substituted group is selected from the class consisting of an alkyl having from 1 to 12 carbon atoms, a cycloalkyl having from 4 to 6 carbon atoms, an aryl having from 6 to 12 carbon atoms, and combinations thereof; and the heterocyclic nitrogen compounds of pyrrole and pyridine.

17 Claims, No Drawings

REMOVAL OF CATALYTIC RESIDUES FROM HYDROGENATED THERMOPLASTIC OR ELASTOMERIC POLYMERS

CROSS-REFERENCE

This application is a continuation-in-part of U.S. Ser. No. 612,620, filed Sept. 12, 1975, now abandoned, entitled "REMOVAL OF CATALYTIC RESIDUES FROM HYDROGENATED THERMOPLASTIC OR ELASTOMERIC POLYMERS".

BACKGROUND OF THE INVENTION

The present invention relates to the removal of catalytic residues from hydrogenated unsaturated polymers utilizing specific amine compounds.

The catalytic hydrogenation of unsaturated polymers such as unsaturated rubbers is readily utilized in industrial processes. Many methods and compounds have been employed to deactivate and remove the catalysts which generally are organonickel, organoiron or organocobalt compounds. Usually these methods are not very efficient in the removal of substantially all of the catalysts, tend to be costly, involve complex methods or procedures and do not relate to the use of amine or glyoxime compounds.

Considering various prior art patents, U.S. Pat. No. 3,793,306, granted Feb. 19, 1974 to Farrar, relates to the addition of aqueous soluble phosphate salts in the presence of a thiuram polysulfide oxidant which reacts with a specific nickel catalyst. U.S. Pat. No. 3,793,307, granted Feb. 19, 1974 to DeVault is very similar to Farrar except that the oxidant is selected from the molecular oxygen or an oxygen-containing compound having an electro-chemical reaction potential of at least 0.25 volts at 25° C. U.S. Pat. No. 3,780,137, granted to Hassell on Dec. 18, 1973, relates to a process of contacting a nickel catalyst residue with gaseous carbon monoxide to form nickel carbonyl and then volatilizing the nickel carbonyl from the polymer.

U.S. Pat. No. 3,780,138 to Hassell relates to a method for separating metal catalyst contaminates from organic polymers. However, it does not relate to the use of amine compounds which react with the catalytic residue to cause it to precipitate. Rather, this patent relates to the treatment of the metal contaminate with an oxidant and then treating the reaction product with an aqueous solution of citric acid which evidently ties up or complexes the catalyst. U.S. Pat. No. 3,037,011 to Leibson et al does not relate to the removal of catalysts utilized in the hydrogenation of polymers, but rather to an anionic-type polymerization catalyst. This patent relates entirely to a method of finishing polymers of alpha-olefins in a manner to remove odor-forming materials. After the polymerization, it is necessary to solvate the catalyst components with quenching agents such as alcohols, ethers, and the like. Various leaching aids may be added during the solvation step. After the polymer is at least partially dried, an odorless diluent oxygen-containing azeotropic compound is added so that the odor-forming materials may be removed as a low boiling azeotrope with the azeotropic compound. Thus, the reference fails to suggest the utilization of applicant's amine compounds as well as any precipitation step.

SUMMARY OF THE INVENTION

It is, therefore, an object of the present invention to provide a process for the removal of catalytic residues from hydrogenated polymers.

It is another object of the present invention to remove catalytic residues, as above, wherein removal compounds utilized as HCl salts of amines, HCl salts of diamines and substituted glyoximes containing an alkyl group having from 1 to 12 carbon atoms, a cycloalkyl group having from 4 to 12 carbon atoms, an aryl group having from 6 to 12 carbon atoms, and combinations thereof.

It is a further object of the present invention to remove catalytic residues, as above, wherein removal compounds utilized are heterocyclic nitrogen compounds containing one nitrogen atom and from 3 to about 5 carbon atoms, and multiple ring systems thereof.

It is a further object of the present invention to remove catalytic residues, as above, wherein nickel, cobalt and iron hydrogenation catalysts are effectively removed.

It is a further object of the present invention to remove catalytic residues, as above, wherein very high amounts of the metal catalyst in the hydrogenated polymer solution are recovered.

It is a yet further object of the present invention to remove catalytic residues, as above, according to a process which is readily achieved and inexpensive.

It is a yet further object of the present invention to remove catalytic residues, as above, wherein the hydrogenated polymers are rubber polymers.

These and other objects of the present invention will become apparent from the following specification which describes in detail various embodiments without attempting to discuss all of the modifications in which the invention might be embodied; the invention being measured by the appended claims and not by the details of the specification.

In general, the process for the removal of catalytic residues from hydrogenated polymers, comprises, precipitating the catalytic residue of the hydrogenated polymer with a compound selected from the class consisting of an HCl salt of an amine, an HCl salt of a diamine, a substituted glyoxime, and a heterocyclic nitrogen compound, said amine and said diamine having a group, and said glyoxime substituted group, selected from the class consisting of an alkyl group containing from 1 to 12 carbon atoms, a cycloalkyl group containing from 4 to 12 carbon atoms, an aryl group containing from 6 to 12 carbon atoms, and combinations thereof, and said heterocyclic nitrogen compound selected from the class consisting of pyrrole and pyridine.

DESCRIPTION OF THE PREFERRED EMBODIMENTS

According to the concepts of the present invention, catalytic residues of hydrogenated polymers are easily and effectively removed. Various unsaturated polymers can be readily hydrogenated using conventional or standard methods. Generally, numerous catalysts, usually well known to those skilled in the art, can be utilized. Often these catalysts are in the form of salts, ligands and chelates of metal elements such as nickel, cobalt, iron, and the like.

In general, any hydrogenation catalytic residue may be removed which reacts with the salt of the amine or diamine, the oxime compound, or the heterocyclic nitrogen compound of the present invention, through an oxidation reaction wherein the metal catalysis has an increase in valence of zero or one.

One group of well known catalysts are the trihydrocarbyl aluminum-reduced organonickel catalysts wherein the aluminum compound is represented by the chemical formula Al(R)$_3$ where R is generally an alkyl, cycloalkyl or aryl radical including combinations thereof having from 1 to 20 carbon atoms and the nickel compound has the formula:

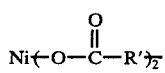

where R' is also an alkyl, cycloalkyl, aryl or combinations thereof having from 1 to 20 carbon atoms. Specific examples of this well known nickel catalyst includes nickel stearate, nickel acetate, nickel propionate, nickel formate, nickel octoate, nickel benzoate, nickel naphthenate, the nickel esters of cyclohexane carboxylic acid, and the like. Additional catalysts include the same compounds wherein cobalt replaces the nickel group and/or in lieu of aluminum, lithium, a tin, or a Grignard reducing agent may be utilized.

Another hydrogenation catalyst group is the reaction product of cobalt (pyridine)$_2$Cl$_2$, a complex of pyridine and cobaltous chloride, and trialkyl aluminum or dialkyl aluminum hydride. Still other hydrogenation catalysts include a reaction product of a cobalt salt of a lactam or other amide or urea compound which is reduced by a trialkyl or triaryl aluminum or a dialkyl or diaryl aluminum hydride.

These catalysts, which are set forth in U.S. Pat. Nos. 3,793,306, 3,882,094 and 3,872,072, are hereby fully incorporated by reference with respect to said catalysts and similar or other conventional or known nickel, cobalt, iron and other hydrogenation catalysts can be utilized in adding hydrogen to points of unsaturation of various polymers. Desirably, the catalytic residue should be removed so that better physical properties result upon cure of the various polymers. Additionally, the hydrogenation process is rendered more economical if the various catalysts are recovered.

Another group of hydrogenation catalytic residues which can be readily removed by the compounds of the present invention are nickel and cobalt catalytic complexes of amino acid derivatives which are readily reduced with alkyl aluminum to give a soluble product in toluene. This product has excellent catalytic activity for the hydrogenation of diolefin polymers and copolymers. Specific catalysts which are employed as a chelating reagent include glycine, alpha- and beta-analine, N-acetylglycine, N-acetylanthranilic acid, N-phenylglycine and N-benzoylglycine (hippuric acid). Although these complexes are not commercially available, they may be readily prepared according to the following reaction:

-continued

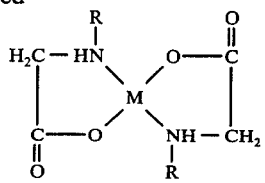

where M = Ni, Co and R is an alkyl, aryl, alkyl carbonyl, aryl carbonyl, having from 1 to about 12 carbon atoms. Generally, these complexes are insoluble in hydrocarbon solvents and slightly soluble in water with the exception of the glycine and N-acetylglycine derivatives of nickel and cobalt which are soluble in water. The solubility of the active catalysts in an aromatic hydrocarbon decrease according to the following ligand order:

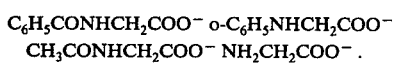

Still another group of hydrogenation catalyst residues, which are readily removed by the compounds of the present invention, are the metal chelate compounds of iron, cobalt or nickel wherein a pair of a nitrogen atom and an oxygen atom of the chelating agent coordinates the metal. Such a catalyst is set forth in U.S. Pat. No. 3,625,927, which is hereby fully incorporated by reference, particularly with respect to the preparation identity and specific examples of the catalyst compound. More specifically, the metal chelate compound can be expressed by the following formula wherein M is nickel, cobalt or iron and n is the number of the chelating agents which coordinate the metal.

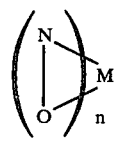

Specific examples of compounds having the above formula, as well as compounds similar thereto, include:
1. hydroxyquinoline 8-hydroxyquinoline 5-methyl-8-hydroxyquinoline 10-hydroxybenzoquinoline
2. hydroxyoxime salicylaldoxime 2-hydroxy-1-acetophenoxime α-benzoinoxime diacetylmonooxime phenanthlenequinonemonooxime α-benzilmonooxime
3. nitrosohydroxy aromatic compounds o-nitrosophenol α-nitroso-β-naphthol β-nitroso-α-naphthol
4. 2-hydroxy-1-acetophenoneoxime salicylaldehydeimine salicylaldehydemethylimine salicylaldehydebenziliimine bis(salicylaldehyde)ethylenediimine
5. aromatic aminoacid 3-amino-2-naphthoic acid quinaldic acid o-hydroxybenzilamine The present invention is generally applicable in the separation or recovery of metals contained in organometallic catalysts systems, such as those set forth above, which are utilized in the hydrogenation of elastomeric or thermoplastic polymers having points of unsaturation. An example of one such polymer is natural rubber which, of course, is made by nature. Generally, the polymers may be made from polyunsaturated monomers containing from 3 to about 12 carbon atoms and, thus, may be dienes or alkynes including dialkynes or polyalkynes. Additionally, copolymers of various monomers may also be utilized. Examples of specific dienes include propadiene, 1,3-butadiene, isoprene, pentadienes such as piperylene, hexadienes such as 1,5-hexadiene, heptadiene such as 1,5-heptadiene, octadiene such as 1,4-octadiene, and the like. Examples of unsaturated copolymers made from various diene monomers include butadiene-isoprene, butadiene-propylene, isoprene-styrene, ethylene-butadiene, alphamethylstyrene-butadiene and styrene-butadiene.

Examples of specific alkynes which may be utilized to form polymers include acetylene, 1,5-hexadiyne and 2,4-hexadiyne. Of course, various non-rubber or thermoplastic unsaturated polymers containing catalytic residues may be utilized although the present process has been found to be very effective in the removal of residues of rubber polymer solutions.

Highly preferred polymeric solutions include those utilized in the making of rubber compounds such as butadiene polymers, styrene-butadiene polymers, isoprene polymers, and alpha-methylstyrene-butadiene polymers.

Generally, the molecular weight of the various unsaturated polymers may range from about 1,000 to about 500,000 with a more preferred range being from about 1,000 to about 100,000.

In the process of the present invention, various amine compounds are utilized to remove the catalytic residues from the hydrogenated polymer solutions. One class of amine compounds are the various salts of amine and diamine compounds, preferably HCl salts of amine and diamine compounds having an alkyl group containing from 1 to about 12 carbon atoms, a cycloalkyl group having from 4 to about 12 carbon atoms, an aryl group having from 6 to about 12 carbon atoms, and combinations thereof. Generally, the alkyl groups of ethyl, propyl, isopropyl, butyl, sec-butyl, tert-butyl, isobutyl, and the aryl group of phenyl are preferred. Of course, the hydrochloric acid adds to the amine group or function of the amine compound to form the salt. Another and preferred group of amine compounds are the substituted glyoximes wherein the substituted group is an alkyl containing from 1 to about 12 carbon atoms, a cycloalkyl containing from 4 to about 12 carbon atoms, an aryl containing from 6 to about 12 carbon atoms, and combinations thereof. Of course, the glyoximes may contain a substituted group on either carbon atom or both. Preferred substituted glyoximes include methylglyoxime, phenylmethylglyoxime, dimethylglyoxime, and diphenylglyoxime.

Another group of compounds are the heterocyclic nitrogen compounds which contain a single nitrogen atom in a 4 to about 6 member ring and combinations of such rings. Generally, the 5 and 6 member rings and preferred such as pyrrole and the HCl salt of pyridine. However, 6-6, 6-5, 6-6-6, and other ring systems such as quinoline, may also be used.

Since usually the substituted glyoximes are not soluble in hydrocarbon solvents, the glyoxime compound is generally added to the hydrogenated solution containing the catalyst residue in a polar solvent such as THF (tetrahydrofuran). With respect to the substituted amine salts or diamine salt compounds, polar solvents can be utilized such as methanol and ethanol. In order to insure that virtually all of the catalytic residue is removed, an equivalent mole excess, based upon a stoichiometric amount of the amine compound to the catalyst residue, is utilized. Desirably, the mole excess is at least the minimum of 2 with a preferred range being from about 3.0 to about 10. Of course, an equivalent mole excess of less than 2 may be utilized but generally, less than desirable amounts of the catalytic residue is recovered.

The amine recovery agent of the present invention has been found to be particularly suitable with respect to generally any nickel or cobalt catalysts, such as those set forth above, and also with respect to many iron catalysts. Since generally the amine recovery agent causes the catalysts to precipitate, the catalyst may generally be recovered as by filtering the hydrogenated polymer through filtered paper or the like or utilizing any of the conventional filtration processes and washing with water or alcohol. Should the polymer be of a very high molecular weight such that a portion of the polymer would be collected along with the catalyst during filtration, the polymer solution may then be decanted with the polymeric solution being removed and the catalyst precipitate then being collected. Of course, other conventional methods of collecting the catalyst precipitate on one hand and the remaining polymer solution on the other hand may be utilized.

Generally, the hydrogenated polymer solution is treated with the amine removal agent at a temperature of about 25° to about 150° C with a temperature range of about 25° to about 50° C being preferred. Usually, the pressure involved is that of ambient conditions, since atmospheric is suitable.

The recovered catalyst may, of course, be separated from the precipitate in its elemental form through various reactions and, thus, may once again be reacted with various compounds to from a hydrogenation catalyst or the like.

The polymeric solution, which generally no longer contains any catalysts, may be utilized for any well known article or process. For example, the various rubber polymers may be utilized for such articles as tire tread, hoses, gaskets, and the like.

According to the present invention, it has been found that virtually all of the catalytic residue (e.g. 300–600 ppm) may be removed so that only a trace, such as below 10–15 ppm, remains. Often, the amount of remaining catalyst generally is about 2 or 3 parts per million and sometimes even zero.

The invention will be better understood by reference to the following examples. Example I relates to the hydrogenation of a butadiene-styrene copolymer and to the removal of a nickel catalyst.

EXAMPLE I

A one gallon stainless steel reactor equipped with a temperature-controlling device, a stirrer and exit ports for sampling was used for the hydrogenation of the polymers. The reactor was charged with 20 percent solution of dihydroxy terminated butadiene-styrene copolymer in 6 pounds of hexane. The reactor was then flushed three times with nitrogen (50 psig) and the preformed catalyst, 3 millimoles of bis(hippurato) nickel per 100 g polymer and 12 millimoles of diisobutylaluminum hydride, was charged in a reactor. The hydrogenation was carried out at 100° C under 200 psig of constant hydrogen pressure for three hours. After hydrogenating, two equivalent moles of dimethylglyoxime in THF based on nickel content was added at 30° C to the hydrogenated product prior to exposure to air. The reddish bis(dimethylglyoximatro) nickel was precipitated and was removed by filtration.

Analysis of the hydrogenated polymer showed the following:

|  | Cis-1,4 | Trans-1,4 | 1,2(Vinyl) | Styrene |
|---|---|---|---|---|
| Control (Butadiene-styrene) | 18.0 | 61.8 | 20.2 | 18.8 |
| Hydrogenated Polymer | 0 | 11.6 | 0.8 | 18.5 |

|  | %H$_2$ | DSV | Gel | Ni |
|---|---|---|---|---|
| Control | 0 | 0.18 | 0 | 600 ppm |
| Hydrogenated Polymer | 84.7 | 0.22 | 0 | 22 ppm |

EXAMPLE II

The reaction of Example I except that three pounds of distilled benzene was charged into the reactor. The preformed catalyst, 5 millimoles of bis(hippurato) nickel and 22 millimoles of diisobutylaluminum hydride, was charged into a reactor. The hydrogenation was then carried out at 100° C under 200 psig of constant hydrogen pressure for three hours. After hydrogenating, the reactant was transferred into a 28 oz. beverage bottle. Two equivalent moles of dimethylglyoxime in THF was added in the bottle at a temperature of 25° C. The nickel complex was precipitated and was removed by filtration. Analysis of the filtration showed no nickel (that is, less than 1 ppm) content in the solution.

EXAMPLE III

Five hundred milliliters of a butadiene-n-hexane blend (20.80) in a 28 oz. beverage bottle was polymerized at 50° C for 20 hours, 0.5 millimoles of n-butyllithium as a catalyst. To the "living" polymer solution was charged a brown solution of the preformed catalyst system consisting of 1.0 millimoles of bis(hippurato) nickel and 5.0 millimoles of diisobutylaluminum hydride in toluene. The hydrogenation was then carried out with magnetic stirring at 25° C under 30 psig pressure of hydrogen for three hours. After hydrogenating, a stoichiometric excess and aqueous solution of pyridine hydrochloride was added into the polymer cement prior to exposure to air. The mixture was stirred at room temperature for half an hour, and then the polymer was coagulated and precipitated slowly with methanol-water containing antioxidant and was removed by filtration. Analysis of the hydrogenated polymer showed that the nickel content was reduced from 0.17 weight percent to 0.01 weight percent by treatment.

While in accordance with the patent statutes, various preferred embodiments have been illustrated and described in detail, it is to be understood that the invention is not limited thereto, the scope of the invention being measured by the scope of the appended claims.

What is claimed is:

1. A process for the removal of a metal catalytic residue, comprising;
   precipitating a metal catalytic residue of a hydrogenated polymer by reacting said metal catalytic residue with an amine compound, said metal catalytic residue selected from the class consisting of nickel, cobalt and iron, said amine compound selected from the class consisting of,
   an HCl salt of an amine, said amine selected from the class consisting of an amine having an alkyl group selected from the class consisting of ethyl, propyl, isopropyl, butyl, sec-butyl, tert-butyl, isobutyl, and an amine having a phenyl group,
   an HCl salt of a diamine having an alkyl group selected from the class consisting of ethyl, propyl, isopropyl, butyl, sec-butyl, tert-butyl, isobutyl, or a phenyl group,
   a substituted glyoxime compound selected from the class consisting of methylglyoxime, phenylmethylglyoxime, dimethylglyoxime and diphenylglyoxime, and
   a heterocyclic nitrogen compound selected from the class consisting of pyrrole and the HCl salt of pyridine.

2. A process for the removal of a metal catalytic residue according to claim 1, wherein the amount of amine compound to said metal catalytic residue is in a stoichiometric excess of at least two.

3. A process for the removal of a metal catalytic residue according to claim 2, wherein said stoichiometric excess of said amine compound to said metal catalytic residue ranges from 2 to 10.

4. A process for the removal of a metal catalytic residue according to claim 3, wherein the hydrogenated polymer is selected from the class consisting of natural rubber, a homopolymer, and a copolymer, said homopolymer made from a monomer selected from the class consisting of dienes having from 3 to 12 carbon atoms and alkynes having from 3 to 12 carbon atoms, and said copolymers made from various combinations of monomers containing at least 1 diene monomer having from 3 to 12 carbon atoms.

5. A process for the removal of a metal catalytic residue according to claim 4, wherein the hydrogenated polymer is selected from the class consisting of natural rubber, a homopolymer, and a copolymer, said homopolymer is made from monomers selected from the class consisting of propadiene, 1,3-butadiene, isoprene, piperylene, 1,5-hexadiene, 1,5-heptadiene, acetylene, 1,5-hexadiyne, 2,4-hexadiyne, and 1,4-octadiene; said copolymer is made from monomers selected from the class consisting of butadiene-isoprene, butadiene-propylene, isoprene-styrene, butadiene-ethylene, alpha-methylstyrene-butadiene and styrene-butadiene.

6. A process for the removal of a metal catalytic residue according to claim 5, wherein said amine compounds are reacted with said metal catalytic residue at a temperature of from about 25° to about 150° C.

7. A process for the removal of a metal catalytic residue according to claim 6, including separating said precipitated metal catalytic residue.

8. A process for the removal of a metal catalytic residue according to claim 7, wherein said separation is achieved by filtration.

9. A process for the removal of a metal catalytic residue according to claim 8, wherein said precipitated metal catalytic residue is washed with a compound selected from the class consisting of water and alcohol.

10. A process for the removal of a metal catalytic residue from a hydrogenated polymer, comprising;
    precipitating the metal catalytic residue of the hydrogenated polymer by reacting said catalytic residue with an amine compound selected from the class consisting of,
    an HCl salt of an amine, said amine selected from the class consisting of an alkyl amine containing from 1 to 12 carbon atoms, a cycloalkyl amine containing from 4 to 12 carbon atoms, an aryl amine containing from 6 to 12 carbon atoms, and combinations thereof, an HCl salt of a diamine, said diamine selected from the class consisting of an alkyl diamine having from 1 to 12 carbon atoms, a cycloalkyl diamine having from 4 to 12 carbon atoms, an aryl diamine having from 6 to 12 carbon atoms, and combinations thereof, a substituted glyoxime, said substituted group selected from the class consisting of an alkyl containing from 1 to 12 carbon atoms, a cycloalkyl containing from 4 to 12 carbon atoms, an aryl containing from 6 to 12 carbon atoms, and combinations thereof, a heterocyclic nitrogen compound selected from the class consisting of pyrrole and the HCl salt of pyridine, and said catalytic residue containing a metal selected from the class consisting of nickel, cobalt and iron.

11. A process for the removal of a metal catalytic residue according to claim 10, wherein the amount of said amine compound to said metal catalytic residue is in a stoichiometric excess of at least two.

12. A process for the removal of a metal catalytic residue according to claim 11, wherein the stoichiometric excess of said amine compound to said metal catalytic residue ranges from about 3.0 to about 10.0.

13. A process for the removal of a metal catalytic residue according to claim 12, wherein the hydrogenated polymer is selected from the class consisting of natural rubber, a homopolymer, and a copolymer, said homopolymer made from a monomer selected from the class consisting of dienes having from 3 to 12 carbon atoms and alkynes having from 3 to 12 carbon atoms, said copolymers made from various combinations of monomers containing at least one diene monomer having from 3 to 12 carbon atoms.

14. A process for the removal of a metal catalytic residue according to claim 13, wherein the hydrogenated polymer is selected from the class consisting of natural rubber, a homopolymer, and a copolymer, said homopolymer is made from monomers selected from the class consisting of propadiene, 1,3-butadiene, isoprene, piperylene, 1,5-hexadiene, 1,5-heptadiene, acetylene, 1,5-hexadiyne, 2,4-hexadiyne, and 1,4-octadiene; said copolymer is made from monomers selected from the class consisting of butadiene-isoprene, butadiene-propylene, isoprene-styrene, butadiene-ethylene, alpha-methylstyrene-butadiene and styrene-butadiene.

15. A process for the removal of a metal catalytic residue according to claim 13, wherein said homopolymer is made from monomers selected from the class consisting of butadiene and isoprene, and said copolymers are made from monomers selected from the class consisting of alpha-methylstyrene-butadiene, butadiene-isoprene, styrene-butadiene and styrene-isoprene.

16. A process for the removal of a metal catalytic residue according to claim 13, including carrying out said reaction at a temperature of from about 25 to about 50° C.

17. A process for the removal of a metal catalytic residue according to claim 13, wherein said metal catalytic residue is a trihydrocarbonyl aluminum reduced organonickel compound wherein said aluminum compound has the formula Al(R)$_3$ where R is an alkyl, a cycloalkyl, or an aryl radical having from 1 to 20 carbon atoms, and combinations thereof, and said nickel compound has the formula

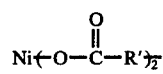

where R' is an alkyl, a cycloalkyl, or an aryl radical having from 1 to 20 carbon atoms, and combinations thereof.

* * * * *